United States Patent
Stoutenburg et al.

(10) Patent No.: US 6,502,747 B1
(45) Date of Patent: *Jan. 7, 2003

(54) SYSTEM AND METHOD FOR PERFORMING MONEY TRANSFER TRANSACTION USING TCP/IP

(75) Inventors: Earney E. Stoutenburg, Highland, CO (US); Dean A. Seifert, Parker, CO (US)

(73) Assignee: First Data Corporation, Hackensack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,013

(22) Filed: Dec. 17, 1999

Related U.S. Application Data

(63) Continuation-in-part of application No. 09/427,249, filed on Oct. 26, 1999.

(51) Int. Cl.[7] ............................................. G06K 17/60
(52) U.S. Cl. ........................ 235/379; 235/382; 902/5
(58) Field of Search ............................... 235/379, 380, 235/382; 705/35, 42, 43, 44; 902/24, 39

(56) References Cited

U.S. PATENT DOCUMENTS

| | | |
|---|---|---|
| 4,032,931 A | 6/1977 | Haker |
| 4,454,414 A | 6/1984 | Benton |
| 5,083,272 A * | 1/1992 | Walker et al. ............... 364/412 |
| 5,283,829 A | 2/1994 | Anderson |
| 5,461,217 A | 10/1995 | Claus |
| 5,650,604 A | 7/1997 | Marcous et al. |
| 5,764,888 A | 6/1998 | Bolan et al . |
| 5,787,403 A | 7/1998 | Randle |
| 5,897,989 A | 4/1999 | Beecham |
| 5,899,982 A | 5/1999 | Randle |
| 5,902,983 A | 5/1999 | Crevelt et al. |
| 5,903,881 A * | 5/1999 | Schrader et al. ............ 235/379 |
| 5,913,202 A * | 6/1999 | Motoyama .................... 705/35 |
| 5,920,848 A * | 7/1999 | Schutzer et al. .............. 705/42 |
| 5,949,044 A | 9/1999 | Walker et al. |
| 6,003,763 A | 12/1999 | Gallagher et al. |
| 6,027,216 A | 2/2000 | Guyton et al. |
| 6,035,406 A | 3/2000 | Moussa et al. |
| 6,039,250 A | 3/2000 | Ito et al. |
| 6,064,990 A * | 5/2000 | Goldsmith .................... 705/75 |
| 6,070,156 A | 5/2000 | Hartsell, Jr. |
| 6,250,557 B1 * | 6/2001 | Forslund et al. ............ 235/492 |
| 6,275,829 B1 * | 8/2001 | Angiulo et al. ............. 707/104 |
| 6,282,523 B1 * | 8/2001 | Tedesco et al. ................ 705/45 |
| 6,314,169 B1 | 11/2001 | Schelberg, Jr. et al. |

FOREIGN PATENT DOCUMENTS

FR          2699358    *   6/1994  ............ H04I/12/16

\* cited by examiner

*Primary Examiner*—Michael G. Lee
*Assistant Examiner*—Daniel St. Cyr
(74) *Attorney, Agent, or Firm*—Brooks & Kushman, P.C.

(57) ABSTRACT

A method of performing a money transfer transaction through a financial services institution includes receiving information regarding the transaction on a first computer of the financial services institution from a first electronic device using the Transmission Control Protocol/Internet Protocol suite (TCP/IP). The method may also include establishing a T1 connection between the first computer and the first electronic device. A system for performing a money transfer transaction using TCP/IP is also disclosed.

32 Claims, 4 Drawing Sheets

SYSTEM AND METHOD FOR PERFORMING MONEY TRANSFER TRANSACTION USING TCP/IP

CROSS-REFERENCE TO RELATED APPLICATION

This application is a continuation-in-part to U.S. application Ser. No. 09/427,249, which was filed Oct. 26, 1999.

TECHNICAL FIELD

The invention relates to a system and method for performing a money transfer transaction with a financial services institution using the Transmission Control Protocol/Internet Protocol suite (TCP/IP).

BACKGROUND ART

Money transfer transactions performed with a financial services institution include send transactions and receive transactions. Under a send transaction, a sender sends or "wires" money to a recipient through the financial services institution. Under a receive transaction, the recipient receives money through the financial services institution. Many such transactions are also facilitated by other businesses, companies or organizations that act as agents of the financial services institution. Furthermore, both the sender and the recipient may be referred to as customers of the financial services institution and/or the agent.

A prior method of performing a send transaction involves a sender completing a transaction form and providing the form to an agent. The transaction form includes such information as the desired amount of money to be sent, sender information, and recipient information. The agent then enters the information from the transaction form into a computer that is in communication with a central data base of the financial services institution. Alternatively, the agent may read the information to a representative of the financial services institution, and the representative may provide additional information to the agent that is added to the transaction form. Next, the agent collects from the sender the desired amount of money to be sent plus any applicable fees and/or taxes.

Because this method requires the sender to complete the transaction form, and further requires the agent to either input all information included on the transaction form into the computer, or convey the information to a representative of the financial services institution, the method is time-consuming and error prone. Furthermore, the method does not account for language barriers that may arise should the sender speak a different language than the agent.

Another method of performing a send transaction involves providing a telephone at an agent location with which a sender can access an operator of a financial services institution. The sender then provides information to the operator, such as recipient name, desired amount of money to be sent, and agent location. Next, the operator transmits a transaction form, which includes the information provided by the sender, to an agent at the agent location via a facsimile transmittal machine. The sender then signs the transaction form. Next, the agent collects from the sender the desired amount of money to be sent plus any applicable fees and/or taxes. The agent then signs the transaction form and transmits the form back to the operator. Next, the operator enters the information from the transaction form into a central data base of the financial services institution.

Still another method of performing a send transaction includes providing a sender an access card that is used to access a central data base of a financial services institution. The sender provides the access card to an agent, and the agent retrieves from the central data base a list of potential recipient names previously identified by the sender. After the list has been retrieved, the sender selects a desired recipient from the list, and provides a desired amount of money to be sent to the selected recipient. Next, the agent collects from the sender the desired amount of money to be sent plus any applicable fees and/or taxes.

A prior method of performing a receive transaction involves a sender providing a recipient a money transfer control number (MTCN), which represents a unique key to transaction information stored in a data base. The MTCN is then provided to an agent by the recipient. Next, the agent accesses the data base and obtains a receive amount that corresponds to the MTCN. The agent then issues a check, money order, or cash to the recipient for the receive amount.

A prior method of transmitting data regarding a particular money transfer transaction involves utilizing dedicated computer systems that communicate via a dial-up connection using modems. Furthermore, the dedicated computer systems have proprietary software of a particular financial services institution installed thereon in order to facilitate transmission of data. Such dedicated computer systems and proprietary software, however, are costly to provide. In addition, dial-up connections are slow to establish and provide low data transmission rates between the computer systems.

DISCLOSURE OF INVENTION

The present invention overcomes the shortcomings of the prior art with respect to transmitting data by providing an improved method and system for performing money transfer transactions using the Transmission Control Protocol/Internet Protocol suite (TCP/IP). The method and system of the invention reduce total transaction time and cost compared with prior art methods and systems.

Under the invention, a method of performing a money transfer transaction through a financial services institution includes receiving information regarding the transaction on a first computer of the financial services institution from a first electronic device using TCP/IP. The first electronic device may be any suitable device such as a computer, kiosk, or terminal.

Preferably, the method further includes establishing a T1 connection between the first computer and the first electronic device. More specifically, the method may include establishing a T1 connection between the first computer and a first Internet service provider, wherein receiving information comprises receiving information regarding the transaction on the first computer from the first electronic device via the Internet.

The method may also include transmitting additional information regarding the transaction from the first computer to the first electronic device using TCP/IP. Furthermore, the method may include receiving a desired amount of money to be sent from the first electronic device, establishing a code corresponding to the desired amount of money to be sent, and transmitting the code to a second electronic device using TCP/IP. It is to be understood that the first and second electronic devices may be the same or different.

More specifically, a method according to the invention of performing a send money transfer transaction through a financial services institution includes receiving transaction details on a first computer of the financial services institution using TCP/IP, wherein the transaction details include a desired amount of money to be sent; establishing a code that corresponds to the transaction details; and transmitting the code from the first computer to an electronic transaction staging device using TCP/IP.

Further under the invention, a system for performing a money transfer transaction includes a first computer adapted to communicate with an electronic device using TCP/IP, wherein the first computer is configured to receive information regarding the transaction from the electronic device.

More specifically, a system according to the invention for performing a send money transfer transaction includes a transaction staging device configured to transmit transaction details using TCP/IP, and a first computer in communication with the transaction staging device for receiving the transaction details using TCP/IP. The first computer is further configured to store the transaction details and to establish a code that corresponds to the transaction details. The system also includes an electronic transaction fulfillment device in communication with the first computer. The transaction fulfillment device is configured to receive the code as an input thereto, and to retrieve the transaction details from the first computer based on the code using TCP/IP.

These and other objects, features and advantages of the invention are readily apparent from the following detailed description of the best modes for carrying out the invention when taken in conjunction with the accompanying drawings.

BEST MODES FOR CARRYING OUT THE INVENTION

Figure 1:
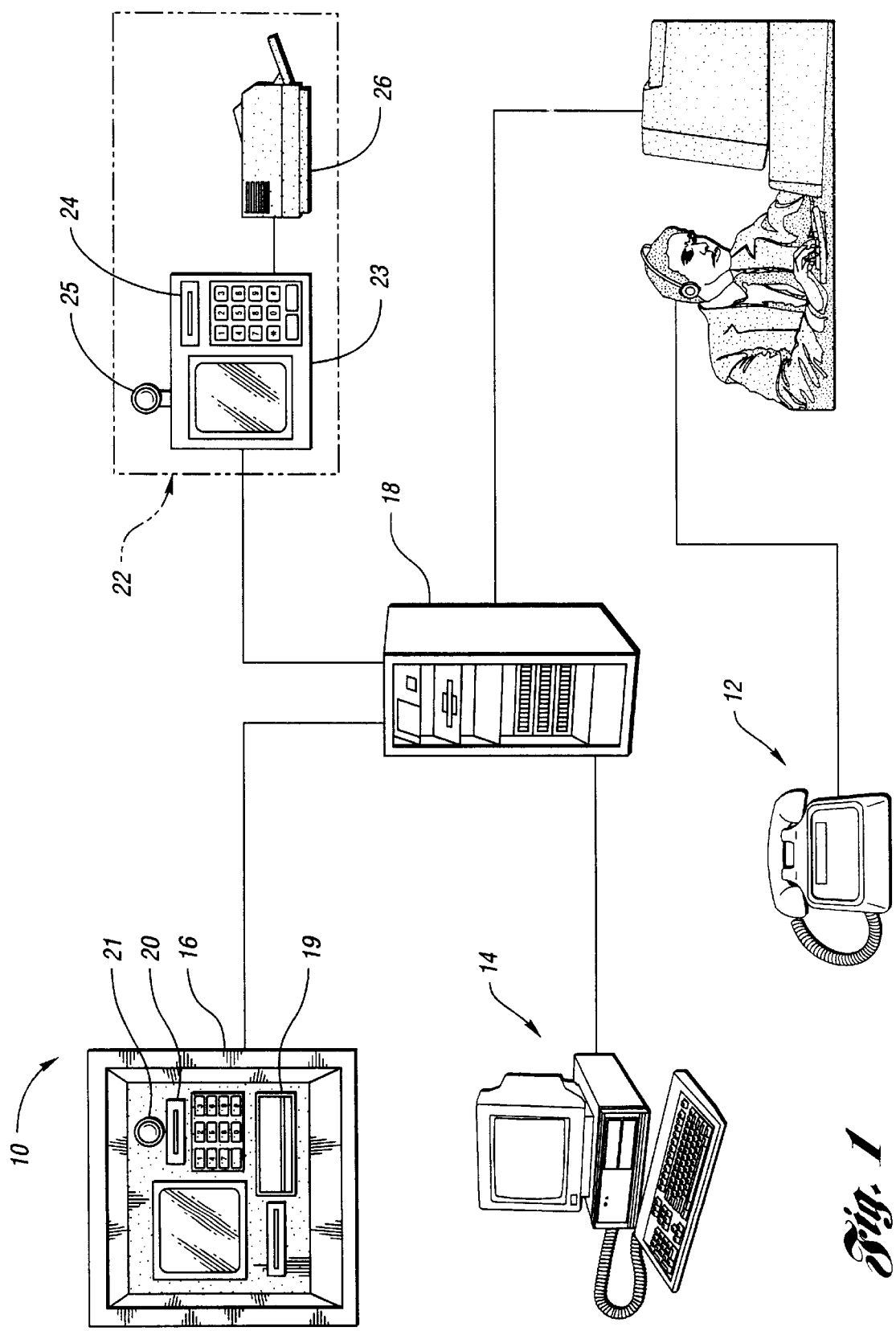
FIG. 1 is a schematic diagram of one embodiment of a system according to the invention for performing a money transfer transaction through a financial services institution.

FIG. 1 shows a system 10 according to the invention for performing an electronic data transfer to effect a money transfer transaction with a financial services institution. Such money transfer transactions include send transactions and receive transactions. Under a send transaction, a sender electronically sends or "wires" money to a recipient through the financial services institution. Under a receive transaction, the recipient receives the money through the financial services institution. These money transfer transactions may also be facilitated by an agent that may receive a commission for each transaction. Agent, as used herein, refers to a person who assists in one or more money transfer transactions through the financial services institution, but is not a direct employee of the financial services institution. Furthermore, both the sender and the recipient may be referred to as customers of the financial services institution and/or the agent.

The system 10 includes one or more transaction set-up or staging devices, such as a telephone 12, a personal computer 14, and/or a kiosk 16. The personal computer 14 has an alpha-numeric keypad, a central processing unit and a display device such as a monitor. The kiosk 16 is an unattended electronic device capable of receiving input and displaying information. For example, the kiosk 16 may be an automated teller machine or ATM.

These transaction staging devices are used to access the financial services institution and to obtain and/or provide transaction details regarding a particular transaction as explained below in greater detail. Advantageously, the transaction staging devices may be disposed at numerous locations remote from the financial services institution to provide extensive access to the financial services institution. For example, one or more transaction staging devices may be disposed at each of several agent locations, such as convenience stores, drug stores, or other suitable facilities. As another example, one or more transaction staging devices may be disposed at the consumer's home or place of business.

The telephone 12 is preferably configured to provide direct and immediate access to a customer services representative (CSR) or other employee of the financial services institution. For example, the telephone 12 may be automatically connected to the CSR simply by picking up the handset. Alternatively, the telephone 12 may be any type of telephone such as a pay telephone, cellular telephone, or home telephone. Furthermore, the CSR has access to a central data base, such as a first or host computer 18 of the financial services institution, and the CSR can enter information into and receive information from the host computer 18. Alternatively, the CSR may have access to a secondary data base that is in communication with the host computer 18.

The personal computer 14 and kiosk 16 are also in communication with the host computer 18 either directly or indirectly, such as through a secondary data base. Advantageously, the sender and/or recipient may use the personal computer 14 and/or kiosk 16 to directly or indirectly access the host computer 18. For example, the sender may use the personal computer 14 to access the host computer 18 through the internet. The kiosk 16 may also be provided with a card encoder or dispenser 19, a card reader 20, and a scanning device 21 such as a voice scanner, fingerprint scanner, a retina scanner or a face scanner. Alternatively, the kiosk 16 may be provided with multiple scanning devices.

The system 10 further includes an electronic transaction fulfillment device, such as an electronic terminal 22 having a keypad 23, for completing the money transfer transaction. Alternatively or supplementally, the electronic terminal 22 may be provided with a card reader 24 and/or a scanning device 25 such as a fingerprint scanner, a retina scanner or a face scanner. Furthermore, the electronic terminal 22 may be provided with multiple scanning devices. The electronic terminal 22 is in communication with the host computer 18, and is used to retrieve transaction details stored on the host computer 18. In one embodiment of the system 10, the electronic terminal 22 is a personal computer having an alpha-numeric keypad, a central processing unit, and a display device such as a monitor. In another embodiment of the system 10, the electronic terminal 22 is an FDX-400® available from Western Union of Englewood, Colo. The FDX-400® has a numeric keypad, one or more function keys and a display device.

The electronic terminal 22 also preferably includes a printer 26 for printing a record of the money transfer transaction. For example, the electronic terminal 22 may be used to print a receipt and/or a negotiable instrument, such as a check or money order. Alternatively, a printer may be provided as a separate component that is in communication with the electronic terminal 22 and the host computer 18.

It should be noted that the transaction staging device and the transaction fulfillment device may be the same device. For example, if the kiosk 16 is able to print a record of the money transfer transaction through an on-board printer or a remote printer, the kiosk 16 may also function as the transaction fulfillment device. As another example, if the electronic terminal 22 is able to receive alpha-numeric input, the electronic terminal 22 may also function as the transaction staging device.

Figure 2:
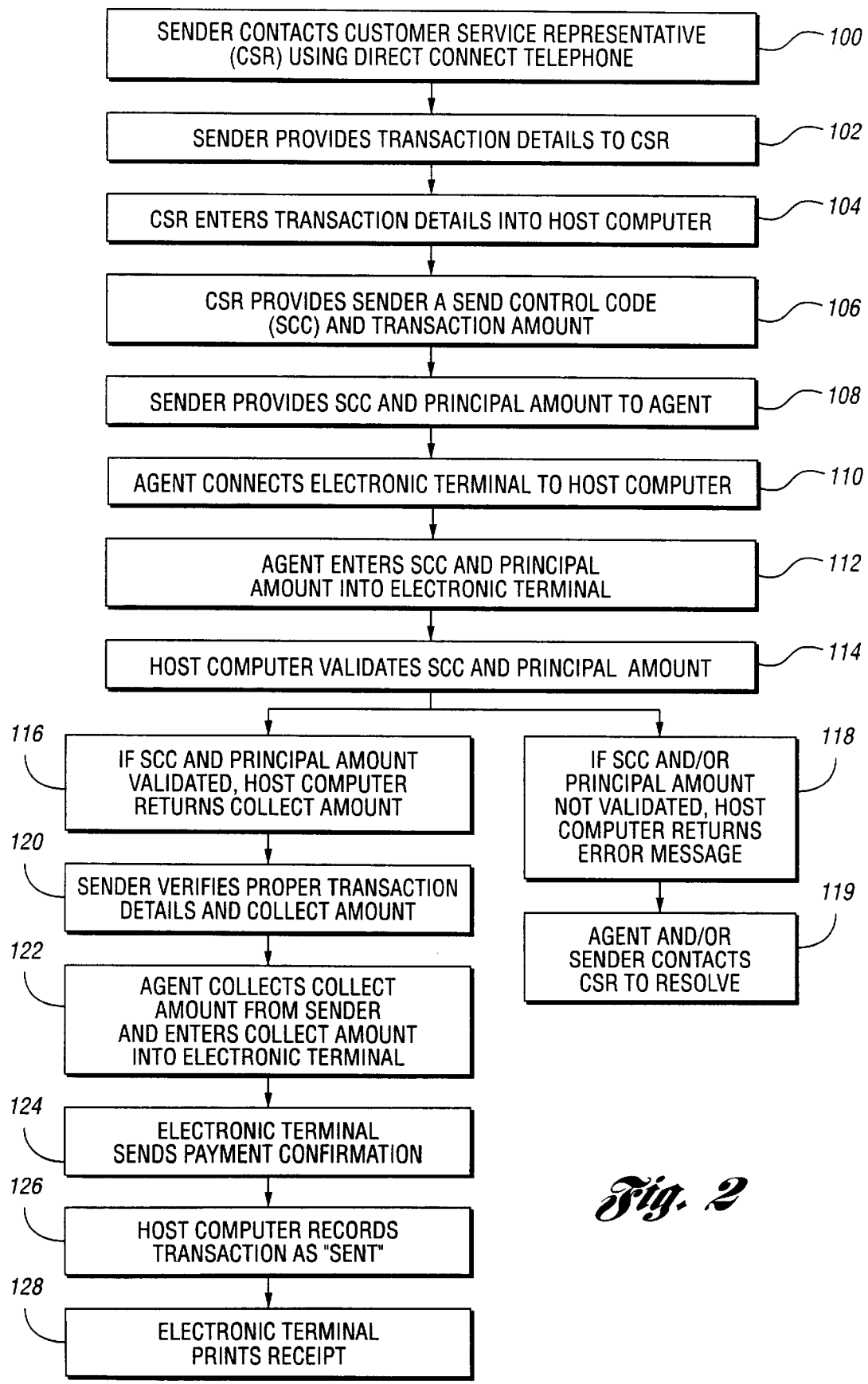
FIG. 2 is a flow chart illustrating operation of a system or method according to the invention for performing a send transaction.

FIG. 2 is a flow chart illustrating operation of a method or system, such as the system 10, for performing a send transaction according to the invention. The send transaction can be divided into a transaction set-up or staging process and a transaction fulfillment process. At step 100, the sender begins the transaction staging process by using the telephone 12 to contact the CSR. Next, the sender provides transaction information or details to the CSR at step 102. Such details may include the sender's name and address, recipient name, and a desired amount of money to be sent to the recipient, which may be referred to as principal amount. At step 104, the CSR enters the transaction details into the host computer 18, which stores the transaction details. It is to be understood that the transaction details are not necessarily entered immediately into the host computer 18. For example, the CSR may enter the transaction details into a separate computer that downloads data to the host computer 18 at a later time. If the principal amount is over a certain amount, the host computer 18 may also request supplemental information from the sender, such as driver's license number, social security number, date of birth, etc. in order to comply with institutional and/or regulatory requirements.

At step 106, the CSR provides the sender a send control code (SCC) and a transaction amount, which represents the principal amount plus any transaction fee and taxes, if applicable. If a printer is located proximate the telephone 12, the SCC and transaction amount may be printed on paper. The SCC and transaction amount are also stored on the host computer 18 as part of the transaction details. The SCC is preferably a numeric code and is used to uniquely identify the send transaction on the host computer 18. The SCC may, however, comprise one or more alpha-numeric characters, symbols, sounds, and/or images. For example, the SCC may be the sender's name, the recipient's name, a bar code, or other decipherable symbol or symbols. Furthermore, the SCC may be printed using an optical character recognition font (OCR), and/or magnetic ink.

Alternatively, the SCC and transaction amount may be obtained or otherwise established by using the personal computer 14, the kiosk 16, or any other suitable transaction staging device to access the host computer 18 directly or indirectly. For example, the personal computer 14 may be used to access the host computer 18 through the internet, and the host computer 18 may provide the SCC and the transaction amount directly to the sender such as by electronic mail. As another example, if the kiosk 16 is provided with one of the scanning devices 21 described above, the kiosk 16 may be used to establish the SCC as the sender's voice print, fingerprint, retinal image, facial image and/or other anatomical image. As another example, if the kiosk 16 or other transaction staging device is provided with the card dispenser 19, the kiosk 16 may be used to encode and dispense a card with the SCC and/or the transaction amount printed or otherwise encoded, such as magnetically or electronically, thereon. As yet another example, a source of cards having different SCC's pre-printed or otherwise encoded thereon, may also be disposed proximate the kiosk 16. During the transaction staging process, one of the cards may be selected by the sender and swiped across or otherwise entered into the card reader 20 of the kiosk 16 so that the host computer 18 can correlate the particular SCC with the transaction details entered by the sender. The host computer 18 may then provide the transaction amount to the sender.

Once the SCC and transaction amount have been obtained by the sender, the transaction staging process is complete. At this point, the send transaction is maintained on the host computer 18 in a pending state. If the send transaction does not progress to the transaction fulfillment process within a predetermined amount of time, the send transaction may be purged from the host computer 18.

Because the sender can deal directly with the CSR or host computer 18, the transaction staging process is relatively simple and efficient. As a result, money transfer transactions may be performed at a variety of locations, such as convenience stores, drug stores, service stations and the like, thereby increasing the distribution network of the financial services institution. Advantageously, there are no forms that need to be completed by the sender, nor are any agents required to be involved in the transaction staging process. Furthermore, the sender may be provided access to various CSR's having various foreign language competencies in order to accommodate language differences.

At step 108, the sender begins the transaction fulfillment process by providing the SCC and principal amount, or just the SCC, to an agent at the agent location. Next, the agent connects the electronic terminal 22 to the host computer 18 by pressing a function key on the keypad 23 at step 110. At step 112, the agent enters the SCC and the principal amount into the electronic terminal 22 by using the keypad 23. Advantageously, because the SCC is preferably a numeric code, the keypad 23 need only include numbers and one or more function keys. Alternatively, the SCC may be entered into the electronic terminal 22 using the card reader 24 or the scanning device 25.

At step 114, the host computer 18 may validate the SCC and principal amount by comparing the SCC and principal amount with the transaction details previously stored on the host computer 18 during the transaction staging process. If the SCC and/or principal amount are valid, the host computer 18 returns some or all of the transaction details and a collect amount, which is the same as the transaction amount, to the electronic terminal 22 as indicated at step 116. Alternatively, some or all of the transaction details may be routed to the electronic terminal 22, or other transaction fulfillment device, prior to the sender entering the SCC. For example, multiple send transactions may be queued on the electronic terminal 22, with each transaction being identified by a particular sender's name. In this case, the SCC is the particular sender's name, and the transaction fulfillment process may be commenced by the sender highlighting or otherwise entering his/her name into the electronic terminal 22.

If the SCC and principal amount are not valid, the host computer 18 returns an error message to the electronic terminal 22 as indicated at step 118. The agent and/or sender may then contact the CSR to resolve the error as indicated at step 119.

If the SCC code and principal amount are valid, the agent verifies with the sender that the proper transaction details and collect amount were returned by the host computer 18, as indicated at step 120. For example, the sender may view the transaction details on a display device of the electronic terminal 22. If the transaction details are not correct, and if the electronic terminal 22 can accept alpha-numeric input, the agent and/or sender may be able to revise the transaction details. Alternatively, the agent and/or sender may contact the CSR to revise the transaction details.

Next, the agent collects the collect amount from the sender and enters the amount tendered into the electronic terminal 22 at step 122. The electronic terminal 22 then sends payment confirmation to the host computer 18 at step 124. Next, at step 126, the host computer 18 records the send transaction as "sent" and sends confirmation to the electronic terminal 22. At this point, funds are available to be picked up by the recipient. At step 128, the electronic terminal prints a receipt for the sender.

Because the agent need not be involved in the transaction staging portion of each send transaction, the agent can process significantly more send transactions in the same amount of time compared with prior systems and methods. Furthermore, because the transaction fulfillment portion is controlled by the host computer 18, agents require less training to operate the system and method of the invention.

Alternatively, the transaction fulfillment process may be accomplished without an agent. For example, the transaction fulfillment process may be carried out by using the kiosk 16 or any other suitable device that is connected directly to or in communication with the host computer 18. The transaction fulfillment process may be commenced by the sender entering the SCC into the kiosk 16 using a keypad, card reader 20, and/or scanning device 21 of the kiosk 16, depending on the type of SCC.

Figure 3:
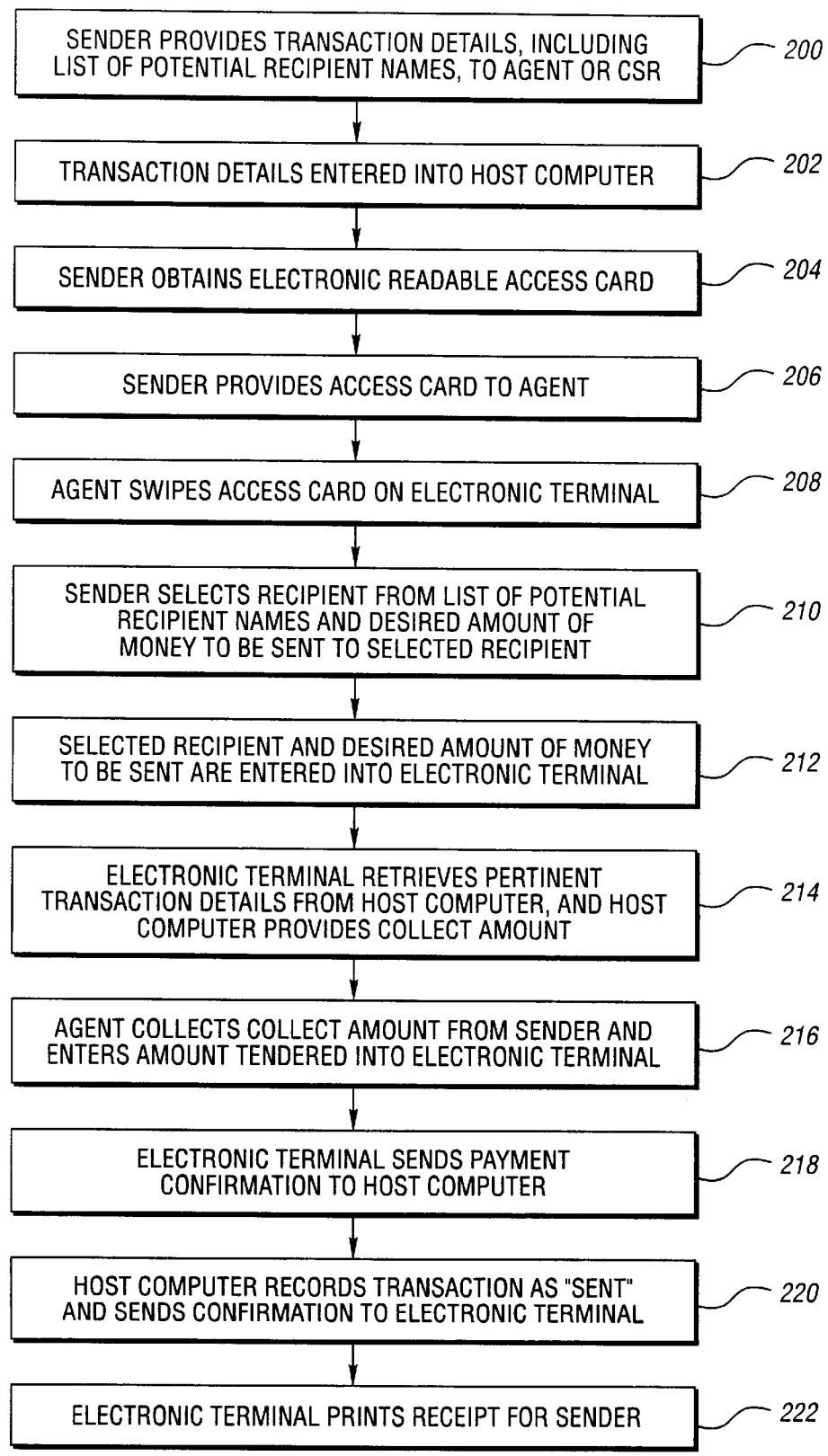
FIG. 3 is a flow chart illustrating operation of a system or method according to the invention for performing a card-assisted send transaction.

FIG. 3 is a flow chart illustrating operation of a method or system, such as the system 10, for performing a card-assisted send transaction according to the invention. Similar to the send transaction, the card-assisted send transaction can be divided into a transaction set-up or staging process and a transaction fulfillment process. At step 200, the transaction staging process begins by the sender providing transaction details to an agent at the agent location or to the CSR or other employee of the financial services institution. Transaction details may include a list of one or more potential recipient names; information about each recipient such as address and telephone number; and information about the sender such as name, address and telephone number. The transaction details are then entered into the host computer 18 at step 202. Next, at step 204, the sender obtains an access card from the financial services institution for accessing the transaction details stored on the host computer 18. The access card contains a card control code (CCC) that corresponds to the particular transaction details provided by consumer, and the CCC is readable by an electronic device, such as the electronic terminal 22. Alternatively, the access card may be generated by the financial services institution based on historical transactions of the sender.

At step 206, the transaction fulfillment process begins by the sender providing the access card to the agent at the agent location. Next, at step 208, the agent enters the CCC into the electronic terminal 22 by swiping the access card on the electronic terminal 22 to thereby access or retrieve the list of potential recipient names. For example, the list of potential recipient names may be displayed on a display device of the electronic terminal 22. Alternatively, the CCC may be entered into the electronic terminal 22 in any suitable manner such as by manually entering the control code on the keypad 23.

At step 210, the sender then selects a recipient from the list of potential recipient names and a desired amount of money to be sent to the selected recipient. The selected recipient and the desired amount of money to be sent are entered into the electronic terminal 22 at step 212. If the desired amount of money to be sent is over a certain amount, the host computer 18 may also request supplemental information from the sender, such as driver's license number, social security number, date of birth, etc. in order to comply with institutional and/or regulatory requirements. Next, at step 214, the electronic terminal retrieves pertinent transaction details from the host computer 18, and the host computer provides a collect amount, which represents the desired amount of money to be sent plus any transaction fee and taxes, if applicable. The agent then collects the collect amount from the sender and enters the amount tendered into the electronic terminal 22 at step 216. The electronic terminal 22 then sends payment confirmation to the host computer 18 at step 218. Next, at step 220, the host computer 18 records the send transaction as "sent" and sends confirmation to the electronic terminal 22. At step 222, the electronic terminal 22 prints a receipt for the sender. It should be noted that for future card-assisted transactions, steps 200 and 202 need only be performed if necessary to update or otherwise modify the list of recipient names or other transaction details.

Alternatively, the access card may be used with the kiosk 16 or other transaction staging device to initiate direct contact with the CSR. For example, the access card may be swiped on the kiosk 16 to initiate a video conference with the CSR. The CCC from the access card is then used to retrieve pertinent transaction details from the host computer 18, including the list of potential recipient names. The sender then selects a recipient from the list of potential recipient names, and provides a desired amount of money to be sent to the selected recipient. Next, the CSR provides the sender a SCC and a transaction amount to complete the transaction staging process. The transaction fulfillment process may then proceed in a manner similar to the transaction fulfillment process described above and illustrated in FIG. 2.

As yet another alternative, the access card may be used with the kiosk 16 or other transaction staging device to obtain direct access to the host computer 18. For example, the access card may be swiped on the kiosk 16 to establish a direct or indirect connection to the host computer 18. The transaction staging process and the transaction fulfillment process may then be carried out on the kiosk 16 by responding to questions generated by the host computer 18 and displayed on the kiosk 16.

Figure 4:
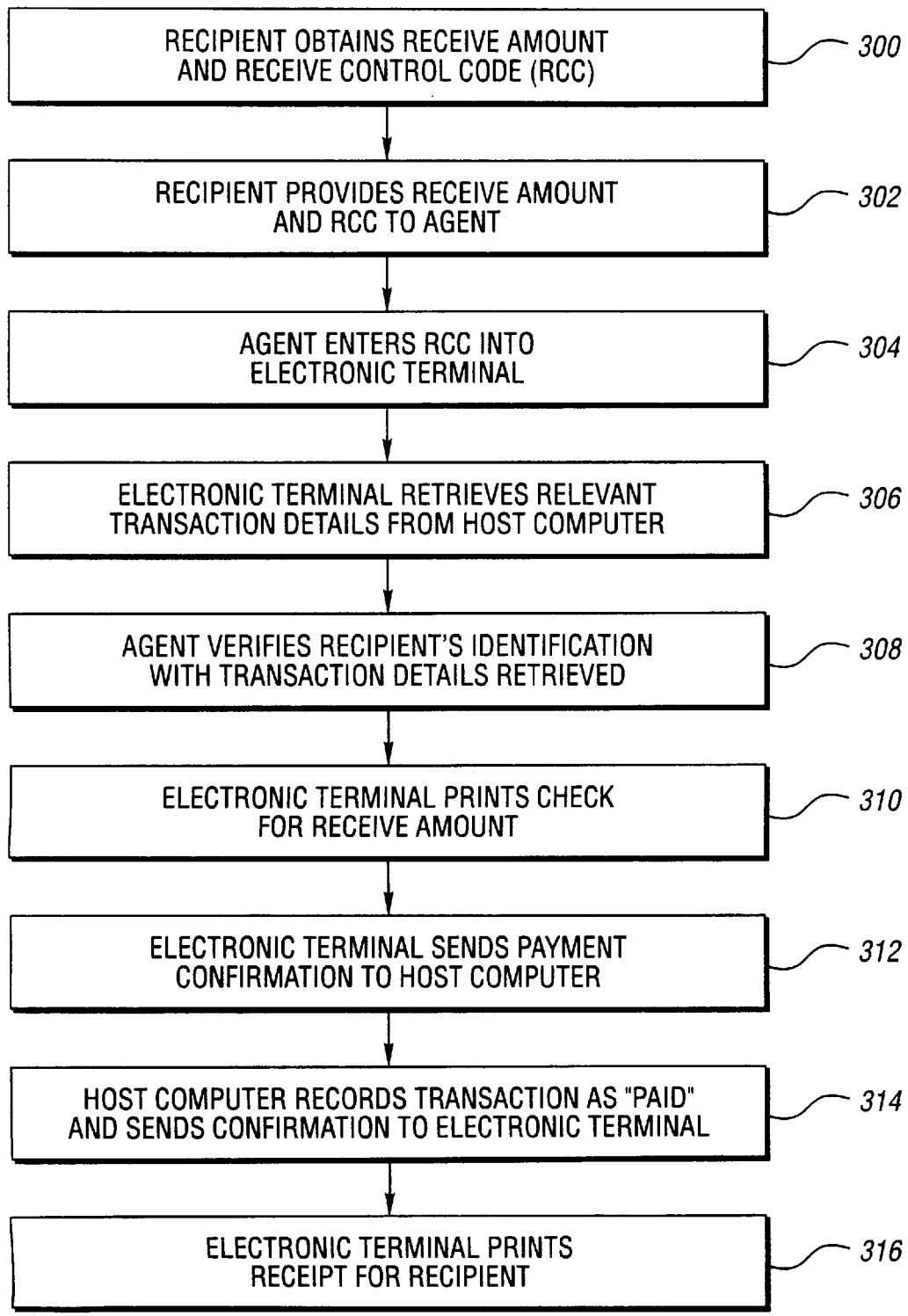
FIG. 4 is a flow chart illustrating operation of a system or method according to the invention for performing a receive transaction.

FIG. 4 is a flow chart illustrating operation of a method or system, such as the system 10, for performing a receive transaction according to the invention. The receive transaction can also be divided into a transaction set-up or staging process and a transaction fulfillment process. At step 300, the transaction staging process begins with the recipient obtaining a receive amount and a receive control code (RCC) for uniquely identifying the receive transaction on the host computer 18. The RCC may be obtained from the CSR using the telephone 12. Alternatively, the RCC may be obtained using any suitable electronic transaction staging device. While the RCC is preferably a numeric code, the RCC may comprise any combination of alpha-numeric characters or other symbols. For example, the RCC may be the recipient's name. In addition, the RCC may only be valid for a predetermined amount of time, such as 15 minutes, and/or at a predetermined location or locations so as to reduce the potential for theft and/or fraud.

At step 302, the recipient begins the transaction fulfillment process by providing the receive amount and RCC to an agent at the agent location. At step 304, the agent enters the receive amount and RCC into the electronic terminal 22. Next, at step 306, the electronic terminal 22 retrieves all relevant transaction details from the host computer 18 via a connection with the host computer 18. If the receive amount is over a certain amount, the host computer 18 may also request supplemental information from the recipient, such as driver's license number, social security number, date of birth, etc. in order to comply with institutional and/or regulatory requirements. At step 308, the agent verifies the recipient's identification with the transaction details retrieved. Next, at step 310, the electronic terminal 22 is used to print a check or other negotiable instrument, such as a cash voucher, for the receive amount. Advantageously, the electronic terminal 22 may be used to print multiple checks or other negotiable instruments if desired by the recipient. Alternatively, the agent may dispense a telephone card and/or money card to the recipient. The agent may also load funds onto a card provided by the recipient. At step 312, the electronic terminal 22 sends payment confirmation to the host computer 18. Next, at step 314, the host computer 18 records the transaction as "paid" and sends confirmation to the electronic terminal 22. At step 316, the electronic terminal 22 prints a receipt for the recipient.

Another aspect of the invention involves performing money transfer transactions using the Transmission Control Protocol/Internet Protocol suite (TCP/IP) to transmit and receive data. For example, if the transaction staging device described above is an electronic transaction staging device, such as the personal computer 14 or kiosk 16, the transaction staging device may be configured to transmit and receive data using TCP/IP. Similarly, the electronic terminal 22, or any other suitable electronic transaction fulfillment device, and the host computer 18 may also be configured to transmit and receive data using TCP/IP.

Advantageously, a T1 connection, or other suitable dedicated connection or communication line such as a cable modem, may be established between a particular electronic transaction staging device and the host computer 18, and between a particular electronic transaction fulfillment device and the host computer 18 to facilitate data transmission and reception using TCP/IP. Such T1 connections may span the entire distance between components, or only a portion of the distance between components. For example, several electronic transaction staging devices may be connected by an Ethernet connection to a network computer, which may be connected to an additional host computer, and the additional host computer may be connected by a T1 line to the host computer 18. Furthermore, if data transmission rates are large enough, T2, T3 or larger connections may also be used.

With such an arrangement, no dial-up function is required to establish a connection between the components. Furthermore, data transmission through T1 lines can occur at much faster rates as compared with conventional modems. For example, a typical T1 line can support data transmission at a rate of 1.544 megabytes per second, while a conventional modem can typically support data transmission at a rate of 128 kilobytes per second.

Alternatively, T1 connections, or other suitable dedicated connections, may be established between the host computer 18 and a first Internet service provider (ISP), between a particular electronic transaction staging device and a second ISP, and between a particular electronic transaction fulfillment device and a third ISP. With this arrangement, data may be transmitted over the Internet using TCP/IP. Furthermore, the first, second and third ISP's may be the same or different.

It is to be understood that any of the steps described above that involve transmitting or receiving information regarding a money transfer transaction using the host computer 18 and/or other electronic device, such as an electronic transaction staging device and an electronic transaction fulfillment device, may be performed using TCP/IP. In addition, any type of money transfer transaction that involves transmitting information between any suitable electronic devices may be performed using TCP/IP. For example, the money transfer transaction methods described in the Background Art section that involve transmitting information between electronic devices may be performed according to the invention using TCP/IP. T1 connections, or other suitable dedicated connections, may also be established between such electronic devices to facilitate data transmission and reception using TCP/IP. Furthermore, TCP/IP may be used to transmit data along the entire distance between electronic devices, or along a portion of the distance between electronic devices if, for example, T1 connections only span a portion of the distance between electronic devices. Alternatively, any suitable connection or communication line, such as an ISDN or DSL connection, may be established between electronic devices.

Because many agent locations may already be equipped with one or more electronic devices, such as computer systems, that are configured to transmit and receive information using TCP/IP, the financial services institution may simply tie into the existing electronic devices, such as by connecting the host computer 18 to the electronic devices, in order to perform money transfer transactions according to the invention. Thus, equipment costs may be significantly reduced under the invention as compared with prior systems and methods that involve dedicated hardware components and proprietary software of a particular financial services institution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of performing a money transfer send transaction through a financial services institution, the method comprising:

receiving transaction information regarding the transaction on a first computer of the financial services institution from a first electronic device using TCP/IP, wherein the transaction information is provided by a sender and includes a desired amount of money to be sent by the sender to a recipient;

storing the transaction information on the first computer;

storing, on the first computer, a code for use by the sender during the send transaction, wherein the code corresponds to the transaction information stored on the first computer;

receiving, at the first computer, an entry corresponding to the code from a second electronic device;

validating the entry; and transmitting a collect amount, to be collected from the sender, from the first computer to the second electronic device if the entry is valid, the collect amount being based on the desired amount of money to be sent;

wherein the code is not provided by or to the recipient for use by the recipient during the send transaction.

2. The method of claim 1 wherein the first electronic device is a computer.

3. The method of claim 1 wherein the first electronic device is a kiosk.

4. The method of claim 1 wherein the first electronic device is a terminal.

5. The method of claim 1 further comprising establishing a T1 connection between the first computer and the first electronic device.

6. The method of claim 1 further comprising establishing a T1 connection between the first computer and a first Internet service provider, wherein receiving transaction information comprises receiving the transaction information on the first computer from the first electronic device via the Internet.

7. The method of claim 1 further comprising transmitting additional information regarding the transaction from the first computer to the first electronic device using TCP/IP.

8. The method of claim 1 wherein the first and second electronic devices are the same.

9. The method of claim 1 wherein the code includes a number.

10. The method of claim 1 wherein the code includes a letter.

11. The method of claim 1 wherein the code includes a symbol.

12. The method of claim 1 wherein the code includes a voice print.

13. The method of claim 1 wherein the code includes an anatomical image.

14. The method of claim 1 wherein the code includes a fingerprint.

15. The method of claim 1 wherein the code includes a retinal image.

16. The method of claim 1 wherein the code includes a facial image.

17. The method of claim 1 further comprising receiving at the first computer an additional entry, corresponding to the desired amount of money, from the second electronic device, and validating the additional entry at the first computer prior to the step of transmitting a collect amount.

18. The method of claim 1 further comprising transmitting the code from the first computer to the first electronic device using TCP/IP prior to the step of receiving, at the first computer, an entry corresponding to the code, so that the code may be provided to the sender.

19. The method of claim 1 wherein the step of receiving, at the first computer, an entry corresponding to the code is performed using TCP/IP.

20. A method of performing a money transfer send transaction through a financial services institution, the method comprising:

receiving transaction details on a first computer of the financial services institution, wherein the transaction details are provided by a sender and include a desired amount of money to be sent by the sender to a recipient;

storing the transaction details on the first computer;

establishing a code that corresponds to the transaction details, wherein the code is established for use by the sender during the send transaction;

storing the code on the first computer such that the code is useable to identify the send transaction;

receiving the code at the first computer from an electronic transaction fulfillment device in communication with the first computer after the step of storing the code on the first computer;

validating the code received from the transaction fulfillment device by comparing the code received from the transaction fulfillment device with the code stored on the first computer; and transmitting a collect amount, to be collected from the sender, from the first computer to the transaction fulfillment device if the code received from the transaction fulfillment device is valid;

wherein at least a portion of the method is performed using TCP/IP, and wherein the code is not provided by or to the recipient for use by the recipient during the send transaction.

21. The method of claim 20 further comprising transmitting the code from the first computer to an electronic transaction staging device using TCP/IP.

22. The method of claim 21 wherein the transaction staging device and the transaction fulfillment device are the same.

23. The method of claim 20 wherein establishing a code comprises establishing the code such that the code includes a number, and wherein the method further includes transmitting the code from the first computer to an electronic transaction staging device using TCP/IP prior to the step of receiving the code at the first computer from an electronic transaction fulfillment device.

24. The method of claim 20 wherein establishing a code comprises providing the code on an electronically readable card that is provided to the sender.

25. The method of claim 20 wherein establishing a code comprises printing the code, using an optical character recognition font, on paper that is provided to the sender.

26. The method of claim 20 wherein establishing a code comprises printing the code, using magnetic ink, on paper that is provided to the sender.

27. The method of claim 20 wherein establishing a code comprises establishing the code as a voice print.

28. The method of claim 20 wherein establishing a code comprises establishing the code as an anatomical image.

29. The method of claim 20 wherein establishing a code comprises providing the code to the sender through an employee of the financial services institution.

30. The method of claim 20 wherein establishing a code comprises establishing the code through an electronic transaction staging device.

31. The method of claim 20 wherein the step of receiving the code at the first computer is performed using TCP/IP.

32. The method of claim 31 wherein the transaction fulfillment device is connected to the first computer by a T1 connection that extends, at least partially, between the transaction fulfillment device and the first computer.

* * * * *